(12) United States Patent
Ayers et al.

(10) Patent No.: US 10,958,311 B2
(45) Date of Patent: Mar. 23, 2021

(54) IDENTIFICATION OF DEVICE LOCATION IN HEALTHCARE FACILITY

(71) Applicant: Hill-Rom Services, Inc., Batesville, IN (US)

(72) Inventors: Brandon Ayers, Batesville, IN (US); Collin Davidson, Apex, NC (US); Stephen Embree, Chapel Hill, NC (US); Kenzi L. Mudge, Skaneateles, NY (US); Britten Pipher, Raleigh, NC (US); Timothy Receveur, Apex, NC (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 16/669,856

(22) Filed: Oct. 31, 2019

(65) Prior Publication Data
US 2020/0145057 A1    May 7, 2020

Related U.S. Application Data

(60) Provisional application No. 62/754,157, filed on Nov. 1, 2018.

(51) Int. Cl.
| | |
|---|---|
| *H04B 5/00* | (2006.01) |
| *H04W 4/80* | (2018.01) |
| *H01Q 1/36* | (2006.01) |
| *H01R 13/719* | (2011.01) |
| *H01R 31/06* | (2006.01) |

(52) U.S. Cl.
CPC ............ *H04B 5/0056* (2013.01); *H01Q 1/36* (2013.01); *H01R 13/719* (2013.01); *H01R 31/065* (2013.01)

(58) Field of Classification Search
CPC .. H04B 5/0056; H04B 5/0025; H04B 5/0043; H04B 5/0062; H04W 4/80; H04W 4/02; H04W 4/029; H04W 12/00503; H04W 12/00407; H01Q 1/36; H01R 13/719; H01R 31/065; H01R 13/465; H01R 13/6691; H01R 24/76; H01R 13/665; H04L 12/2809
See application file for complete search history.

(56) References Cited

U.S. PATENT DOCUMENTS

| | | | |
|---|---|---|---|
| 7,268,294 | B2 | 9/2007 | Dhkawa et al. |
| 7,399,205 | B2 | 7/2008 | McNeely et al. |
| 7,483,797 | B2 | 1/2009 | Nambu |
| 8,610,562 | B2 | 12/2013 | Weiner et al. |
| 8,674,826 | B2 | 3/2014 | Becker et al. |

(Continued)

OTHER PUBLICATIONS

European Search Report, Application No. EP 19 20 6752, dated Mar. 26, 2020, 9 pages.

*Primary Examiner* — Andrew Wendell
(74) *Attorney, Agent, or Firm* — Merchant & Gould P.C.

(57) ABSTRACT

A system for identifying a location of a device includes a first antenna mounted to a plug. The first antenna surrounds one or more prongs of the plug, and the plug has a memory that stores a device ID. A second antenna receives the device ID from the first antenna when the plug is coupled to a power outlet. A controller uses a communication module to wirelessly transfer the device ID and a power outlet ID to a computer server. The computer server uses the device ID and the power outlet ID to determine the location of the device within a building.

14 Claims, 7 Drawing Sheets

(56) References Cited

U.S. PATENT DOCUMENTS

| | | | |
|---|---|---|---|
| 8,930,158 B2* | 1/2015 | Elberbaum | G06K 19/077 |
| | | | 702/107 |
| 9,466,877 B2 | 10/2016 | Dixon et al. | |
| 9,520,043 B1* | 12/2016 | Alshinnawi | G06F 1/189 |
| 9,830,424 B2 | 11/2017 | Dixon et al. | |
| 9,838,836 B2 | 12/2017 | Hayes et al. | |
| 9,941,647 B2 | 4/2018 | Huang et al. | |
| 10,085,905 B2 | 10/2018 | Bhimavarapu et al. | |
| 2007/0271474 A1 | 11/2007 | Kim et al. | |
| 2013/0135160 A1* | 5/2013 | Dixon | A61B 5/002 |
| | | | 343/720 |
| 2015/0081335 A1* | 3/2015 | Dixon | G16H 40/20 |
| | | | 705/3 |
| 2018/0026404 A1* | 1/2018 | Geo | H01R 13/713 |
| | | | 439/620.21 |
| 2020/0005002 A1* | 1/2020 | Schmidt, Jr. | G06K 7/10366 |

* cited by examiner

IDENTIFICATION OF DEVICE LOCATION IN HEALTHCARE FACILITY

BACKGROUND

The physical location of a device can be an important piece of information. In the healthcare context, medical devices, such as hospital beds, can include special features both for the comfort and well-being of a patient. Identifying the location of a hospital bed with the healthcare facility can be important, particularly when a patient is in need of attention.

SUMMARY

One aspect relates to a system for identifying a location of a device. The system comprises a first antenna mounted to a plug of the device. The first antenna has a coil shape, and the plug has a memory that stores a device ID. The system comprises a second antenna that receives the device ID from the first antenna when the plug is coupled to a power outlet. The system further comprises a controller that receives the device ID from the second antenna, and that uses a communication module to wirelessly transfer the device ID and a power outlet ID to a computer server. The computer server having a processor and a memory, wherein the memory stores instructions that, when executed by the processor, cause the computer server to use the device ID and the power outlet ID to determine the location of the device within a building.

Another aspect relates to a hospital bed that comprises a power cord having at one end a plug and one or more prongs extending from the plug that are configured to couple the plug to a power outlet. The hospital bed further comprises a first antenna carried by the plug. The first antenna has a shape that surrounds the one or more prongs of the plug. The first antenna is a near-field communication antenna having a memory that stores a device ID transferrable to a second antenna when the first antenna is proximate the second antenna, the device ID is usable by a computer server to determine the location of the hospital bed within a building.

The details of one or more techniques are set forth in the accompanying drawings and the description below. Other features, objects, and advantages of these techniques will be apparent from the description, drawings, and claims.

DETAILED DESCRIPTION

The present application is directed to the determination of the physical location of a device connected to a power outlet within a building. In the example embodiments described herein, the device is a medical device, such as a hospital bed or patient monitoring device, positioned within a healthcare facility having multiple floors and rooms making it difficult to locate a particular medical device that may or may not be associated with a patient of the healthcare facility. Although the example embodiments are described in the context of a healthcare facility and a hospital bed, the principles of the present application are applicable to other types of scenarios and devices, such as medical diagnostic devices and patient lift devices, as well.

Examples of systems that can assist in locating medical devices, such as hospital beds, within a healthcare facility are provided in U.S. Pat. Nos. 7,399,205; 9,466,877; and 9,830,424. The entireties of these references are hereby incorporated by reference.

Figure 1:
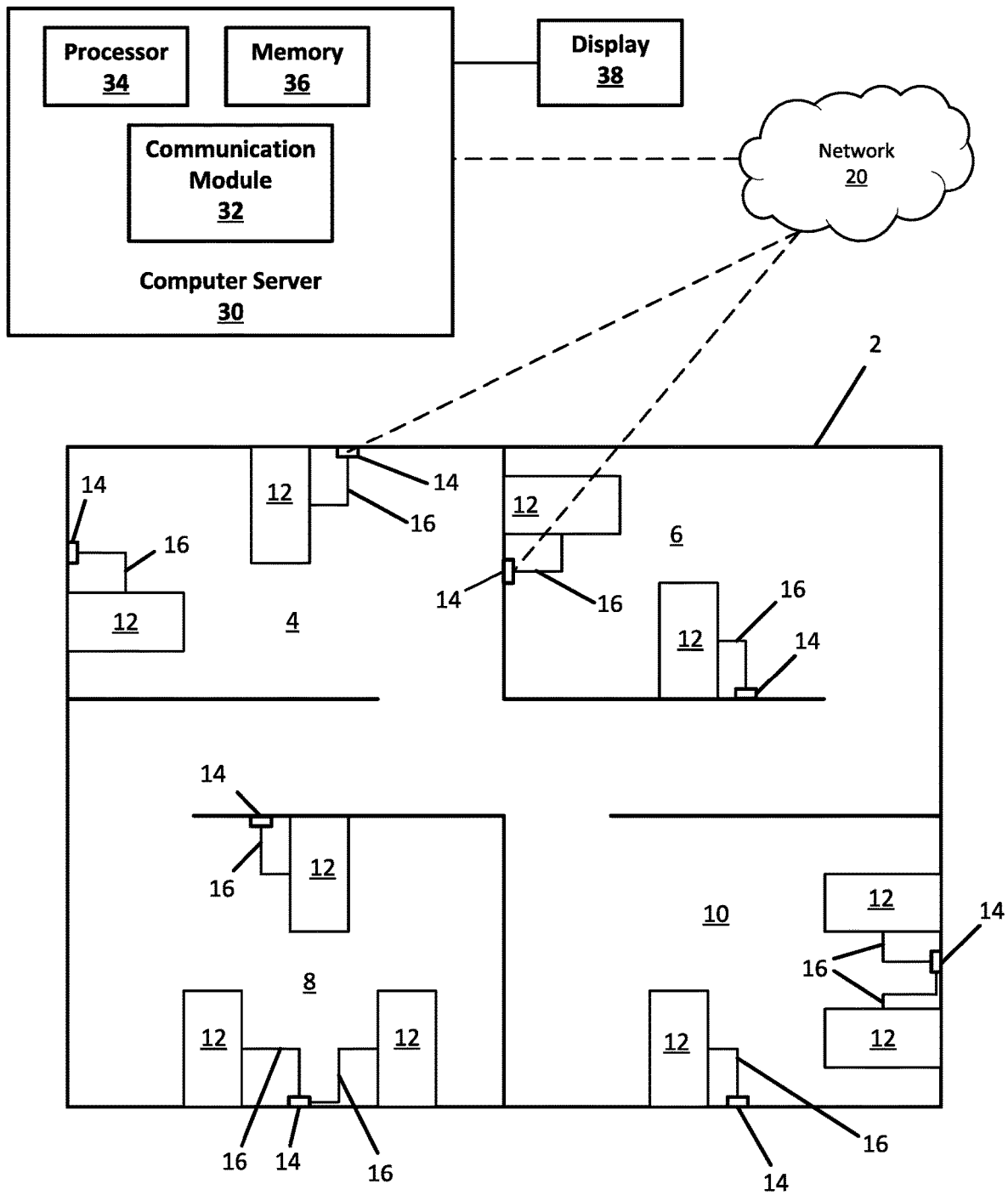
FIG. 1 is a schematic diagram of a healthcare facility having multiple rooms and hospital beds located within each room.

FIG. 1 is a schematic diagram of a healthcare facility 2 having multiple rooms 4, 6, 8, 10 and hospital beds 12 located within each room. Each room within the healthcare facility 2 can have one or more power outlets 14. As shown in FIG. 1, each hospital bed 12 is located next to a power outlet 14 so that a power cord 16 from each hospital bed 12 can be plugged into a power outlet 14 for powering the bed.

As also shown in FIG. 1, each power outlet 14 is connected to a network 20 so that each power outlet 14 can transfer data to the network 20 (only two power outlets 14 are schematically shown connected to the network 20 for ease of illustration). In some examples, each power outlet 14 transfers data wirelessly to the network 20. In other examples, each power outlet 14 transfers data to the network 20 via a wired connection. As will be explained in more detail, the network 20 is connected to a computer server 30 that can use the data transferred from a power outlet 14 to determine a location of a particular hospital bed 12 within the healthcare facility 2.

Figure 2:
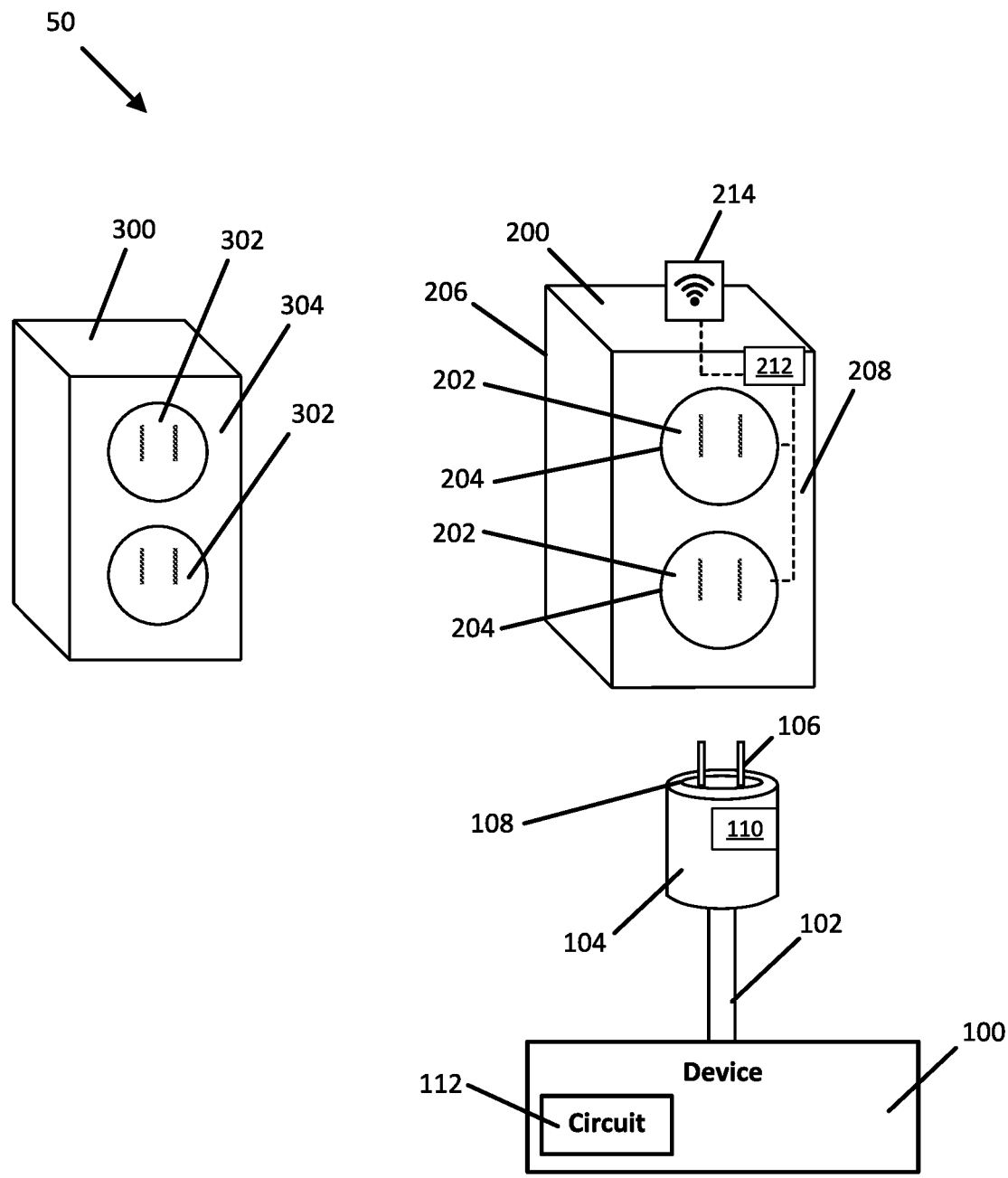
FIG. 2 is schematic diagram of a system that can identify a location of a device.

FIG. 2 is a schematic diagram of a system 50 that can identify a location of a device 100. As shown in FIG. 2, the device 100 includes a power cord 102 having at one end a plug 104 and one or more prongs 106 that extend from the plug 104. The prongs 106 are configured to couple the plug 104 to a socket 302 of a power outlet 300. When coupled to the socket 302, the prongs 106 draw electrical power from the power outlet 300 for powering the device 100. In the example shown, the device 100 is a hospital bed. The prongs 106 draw electrical power from the power outlet 300 for powering the hospital bed, including such features as height adjustment, entertainment options like television control, and/or emergency alert options like a call button that can be actuated by the patient to summon assistance from a caregiver.

In the example shown in FIG. 2, the power outlet 300 has two sockets 302 arranged in a vertical configuration. In other examples, the power outlet 300 can have alternative socket configurations such that the power outlet 300 can have a single socket configuration, or multiple sockets arranged in vertical and/or horizontal configurations.

The plug 104 carries a first antenna 108. The first antenna 108 has a shape that surrounds the one or more prongs 106 of the plug 104. In some examples, the shape of the first antenna 108 is an ellipse (e.g., circle, oval, coil etc.) that surrounds the one or more prongs 106. In other examples, the shape of the first antenna 108 is a rectangle, square, or other shape that can surround the one or more prongs 106. In some alternative examples, it is contemplated that the first antenna 108 can be positioned in other areas of the plug 104.

In some examples, the first antenna 108 is embedded in the plug 104 such that the first antenna 108 is spaced or offset from an exterior surface of the plug 104 in a range from about 3 to about 4 cm. In some examples, the first antenna 108 is embedded in the plug 104 such that the first antenna 108 is spaced or offset from an exterior surface of the plug 104 by less than 3 cm.

The plug 104 can have a memory 110 connected to the first antenna 108 and/or embedded within the first antenna 108. The memory 110 can store data such a device ID that can be used to identify the device 100. In some examples, the memory 110 contains the data as read-only data. In some examples, the data stored on the memory 110 is rewriteable. In some examples, the memory 110 can store other data in addition to the device ID.

Figure 3:
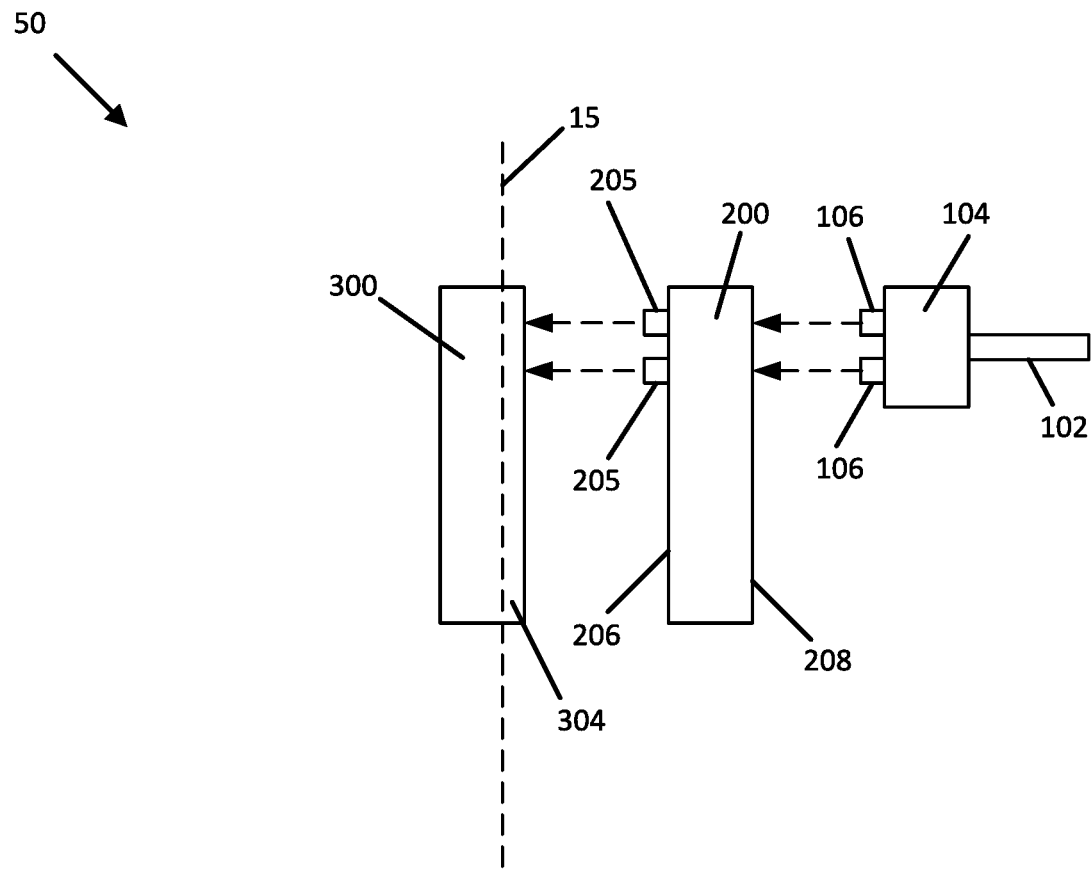
FIG. 3 is a side view showing an interface between a plug, an adapter, and a power outlet in the system of FIG. 2.

In the example shown in FIG. 2, the system 50 includes an adapter 200 that can connect to the power outlet 300. FIG. 3 is a side view showing an interface between the adapter 200 and the power outlet 300. As shown in FIGS. 2 and 3, the adapter 200 can include one or more prongs 205 on a rear surface 206 of the adapter 200 that are insertable into at least one socket 302 in the power outlet 300 to connect the adapter 200 to the power outlet 300. When the adapter 200 is connected to the power outlet 300, the adapter 200 substantially covers a faceplate 304 of the power outlet 300, and is substantially parallel with a wall 15 into which the power outlet 300 is mounted. The adapter 200 has at least one socket 202 on a front surface 208 that can receive the one or more prongs 106 of the plug 104. When connected to the power outlet 300, the adapter 200 can provide an electrical connection between the plug 104 and the power outlet 300.

In the example shown in FIG. 2, the adapter 200 is shown as having two sockets 202 arranged in a vertical configuration. In other examples, the adapter 200 can have alternative socket configurations such that the adapter 200 can have a single socket configuration, or multiple sockets arranged in vertical and/or horizontal configurations.

As shown in FIG. 1, the adapter 200 includes second antennas 204 that are embedded within the front surface 208 of the adapter 200. In some examples, the second antenna 204 is spaced or offset from the front surface 208 of the adapter 200 in a range from about 3 to about 4 cm. In some examples, the second antenna 204 is spaced or offset from the front surface 208 of the adapter 200 by less than 3 cm.

Each second antenna 204 has a shape that surrounds a socket 202 in the adapter 200. In some examples, the shape of each second antenna 204 is an ellipse (e.g., circle, oval, coil etc.) that surrounds a socket 202. In other examples, the shape of each second antenna 204 is a rectangle or square or other shape that can surround a socket 202. In some examples, a single second antenna 204 can surround multiple sockets 202. In some examples, it is contemplated that the second antenna 204 can be positioned in other areas of the socket 202.

In the example shown in FIG. 2, the adapter 200 includes two second antennas 204 (each second antenna 204 surrounds a socket 202). In other examples, the adapter 200 can have a single second antenna 204, or can have more than two second antennas 204 as may be needed and/or desired for a particular application.

In some examples, the first antenna 108 is a passive antenna that is part of a circuit that is not wired to a power source. As an example, the first antenna 108 can be a passive near-field communication (NFC) antenna such that the first antenna 108 is a "target" antenna meaning that the first antenna 108 remains in a sleep state unless powered by a radio-frequency (RF) field actively generated by another antenna. In certain examples, the first antenna 108 can have a simple form factor such as an unpowered tag or sticker (e.g., having a coil shape that surrounds the one or more prongs 106 of the plug 104). The coil shape of the first antenna 108 can reduce and/or eliminate the electromagnetic interference from one or more conductors that run in the power cord 102.

In some examples, each second antenna 204 is an active NFC antenna that can power the first antenna 108. Each second antenna 204 can be part of a circuit that actively generates an RF field using power drawn from the power outlet 300 when the adapter 200 is electrically connected to the power outlet 300. The RF field generated by each second antenna 204 can power the first antenna 108 when the first antenna 108 is spaced within a predetermined distance of a second antenna 204. In certain examples, the first antenna 108 is powered when spaced about 4 cm or less from a second antenna 204. This can occur when the one or more prongs 106 of the plug 104 are received in a socket 202 of the adapter 200 (and hence the first antenna 108 is proximate a second antenna 204). When the first antenna 108 is powered by a second antenna 204, the passive first antenna transfers the device ID to the second antenna 204.

In alternative examples, the first antenna 108 is an active NFC antenna such that the first antenna 108 is part of a separate circuit 112 that actively generates an RF field using the first antenna 108 so that the first antenna 108 and a second antenna 204 of the adapter 200 can wirelessly communicate with one another according to a peer-to-peer protocol. In such examples, the separate circuit 112 of the first antenna 108 can be located in the device 100 (e.g., not in the plug 104), and the separate circuit 112 can be connected to the first antenna 108 via a wire that runs in the power cord 102. The separate circuit 112 of the first antenna 108 can be powered by the power outlet 300 via the wire in the power cord 102 when the one or more prongs 106 are inserted in a socket 202 of the adapter 200, and the adapter 200 is electrically connected to the power outlet 300.

As shown in FIG. 2, the adapter 200 includes a controller 212 connected to a communication module 214 and to each second antenna 204. In certain examples, the controller 212 is a microprocessor that includes an internal memory. In some examples, the internal memory of the controller 212 can store data such as a power outlet ID that can be used to identify the power outlet 300 to which the adapter 200 is connected. In some examples, the internal memory of the controller 212 contains the data as read-only data. In some examples, the data stored on the internal memory of the controller 212 is rewriteable. In some examples, the internal memory of the controller 212 can store other data in addition to the power outlet ID.

In some examples, the controller 212 can receive and store the device ID from a second antenna 204, and can use the communication module 214 to wirelessly transfer the device ID and the power outlet ID to the network 20 (see FIG. 1). In some alternative examples, the controller 212 can transfer the power outlet ID and the device ID to the network 20 via a wired connection.

Referring back to FIG. 1, network 20 transmits the device ID and the power outlet ID to the computer server 30. In some examples, the network 20 transmits the device ID and the power outlet ID wirelessly to the computer server 30. In other examples, the network 20 transmits the device ID and the power outlet ID to the computer server 30 via a wired connection.

As shown in FIG. 1, the physical components (i.e., hardware) of the computer server 30 with which embodiments of the disclosure may be practiced are illustrated. In a basic configuration, the computer server 30 may include at least one processor 34, a memory 36, and a communication module 32. The communication module 32 can receive the device ID and the power outlet ID from the network 20. The processor 34 can use the device ID and the power outlet ID to determine the location of the device 100 within a room of the building. In some examples, the processor 34 can use a look-up table stored in the memory 36 that matches the power outlet ID to a particular room or a portion within a particular room of the building, such as a room or a portion of a room within the healthcare facility 2 shown in FIG. 1. Using the device ID, the processor 34 can determine that the device 100 is located within that particular room of the building. Also, the lookup table may have information that identifies a particular patient assigned to the device 100. Therefore, the processor 34 can identify the location of a patient within the healthcare facility 2 using the power outlet ID and the device ID.

Depending on the configuration and type of computer server, the memory 36 may comprise, but is not limited to, volatile storage (e.g., random access memory), non-volatile storage (e.g., read-only memory), flash memory, or any combination of such memories. The memory 36 may include an operating system and one or more program modules suitable for running software applications. The operating system, for example, may be suitable for controlling the operation of the computer server 30. Furthermore, embodiments of the disclosure may be practiced in conjunction with a graphics library, other operating systems, or any other application program and is not limited to any particular application or system. The computer server 30 may have additional features or functionality. For example, the computer server 30 may also include additional data storage devices (removable and/or non-removable) such as, for example, magnetic disks, optical disks, or tape.

The computer server 30 can include, or be connected to, a display 38 that displays the location of the device 100. In some examples, the display 408 can display the location of the device 100 as a room number. In other examples, the display 408 can display the location of the device 100 as a point within a map of the building.

Figure 4:
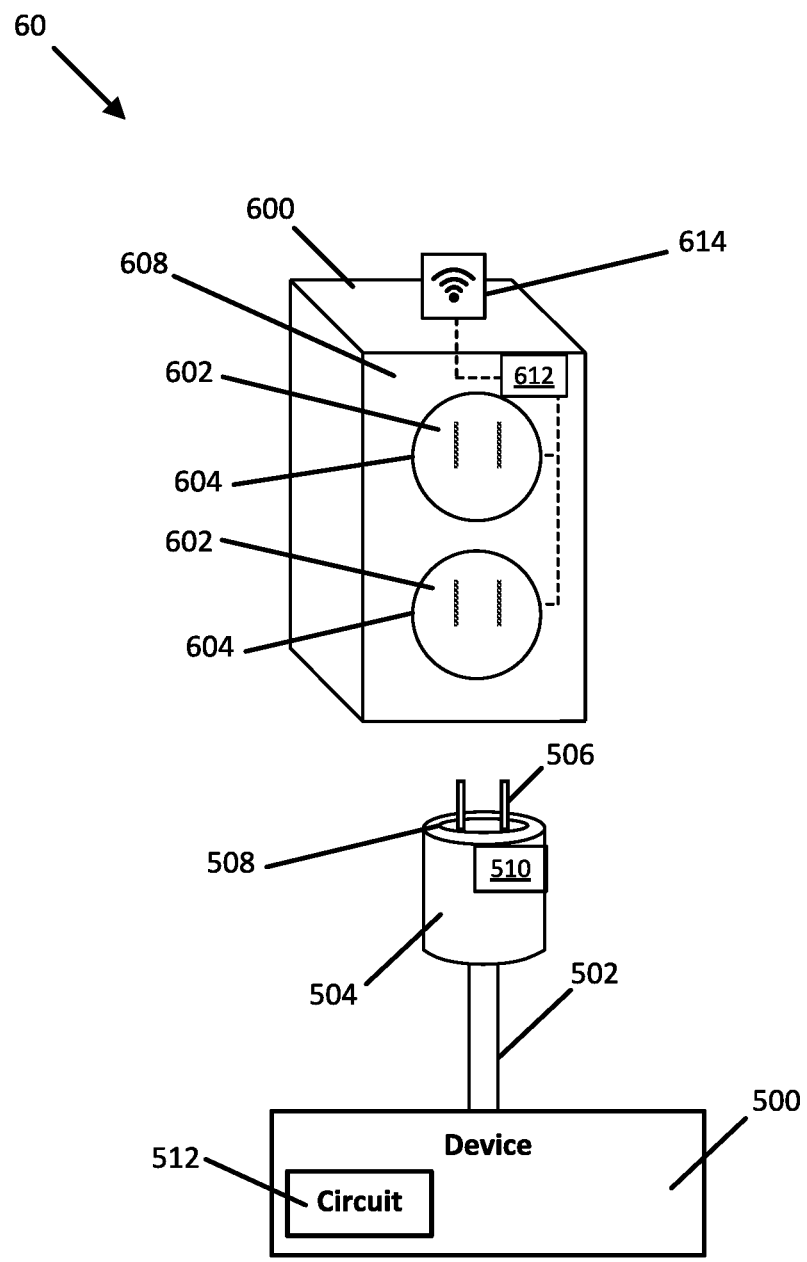
FIG. 4 is a schematic diagram of another system that can identify a location of a device.

FIG. 4 is a schematic diagram of an alternative system 60 that can identify a location of a device 500 within a room of a building. Like in the first example embodiment described above, the device 500 can be a hospital bed within a large building such as a hospital that can have multiple floors and rooms.

The device 500 includes a power cord 502 having at one end a plug 504 and one or more prongs 506 that extend from the plug 504. The one or more prongs 506 are configured to couple the plug 504 to a socket 602 of a power outlet 600. When coupled to the socket 602, the one or more prongs 506 draw electrical power from the power outlet 600 for powering the device 500. In the example shown, the device 500 is a hospital bed. The prongs 506 draw electrical power from the power outlet 600 for powering the hospital bed, including such features as height adjustment, entertainment options like television control, and/or emergency alert options like a call button that can be actuated by the patient to summon assistance from a caregiver.

The plug 504 carries a first antenna 508. The first antenna 508 has a shape that surrounds the one or more prongs 506 of the plug 504. In some examples, the shape of the first antenna 508 is an ellipse (e.g., circle, oval, coil etc.) that surrounds the one or more prongs 506. In other examples, the shape of the first antenna 508 is a rectangle or square or other shape that can surround the one or more prongs 506.

In some examples, it is contemplated that the first antenna 508 can be positioned in other areas of the plug 504.

In some examples, the first antenna 508 is embedded in the plug 504 such that the first antenna 508 is spaced or offset from an exterior surface of the plug 504 in a range from about 3 to about 4 cm. In some examples, the first antenna 508 is embedded in the plug 504 such that the first antenna 508 is spaced or offset from an exterior surface of the plug 504 by less than 3 cm.

The plug 504 can have a memory 510 connected to the first antenna 508 and/or embedded within the first antenna 508. The memory 510 can store data such as a device ID that can be used to identify the device 500. In some examples, the memory 510 contains the data as read-only data. In some examples, the data stored on the memory 510 is rewriteable. In some examples, the memory 510 can store other data in addition to the device ID.

In the example shown in FIG. 4, the power outlet 600 includes a faceplate 608 that can replace a standard faceplate of the power outlet. The faceplate 608 of the power outlet 600 includes several features (described in more detail below) that can be used to identify the location of the device 500 when connected to the power outlet 600.

Figure 5:
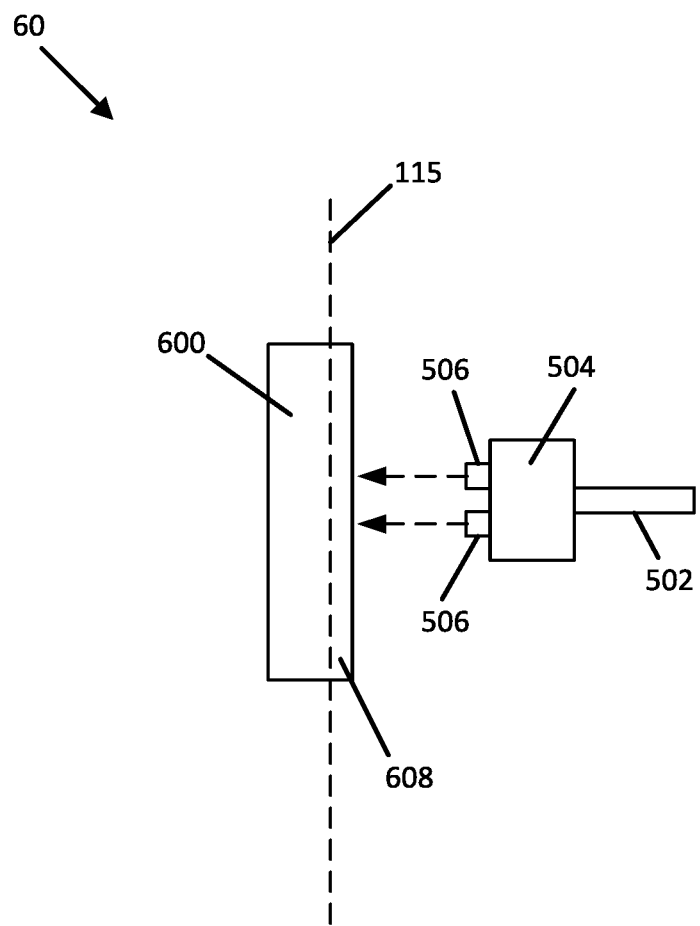
FIG. 5 is a side view showing an interface between a plug and a power outlet in the system of FIG. 4.

FIG. 5 is a side view showing an interface between the plug 504 and the power outlet 600. As shown in FIGS. 4 and 5, the one or more prongs 506 couple the plug 504 to a socket 602 of a power outlet 600 such that the plug 504 abuts and/or faces within close proximity the faceplate 608 of the power outlet 600. As shown in FIG. 5, the faceplate 608 is substantially parallel to a wall 115 of a room and is substantially flush with the wall 115.

As shown in the example of FIG. 2, the power outlet 600 has two sockets 602 arranged in a vertical configuration. In other examples, the power outlet 600 can have alternative socket configurations such that the power outlet 600 can have a single socket configuration, or multiple sockets arranged in vertical and/or horizontal configurations.

Figure 6:
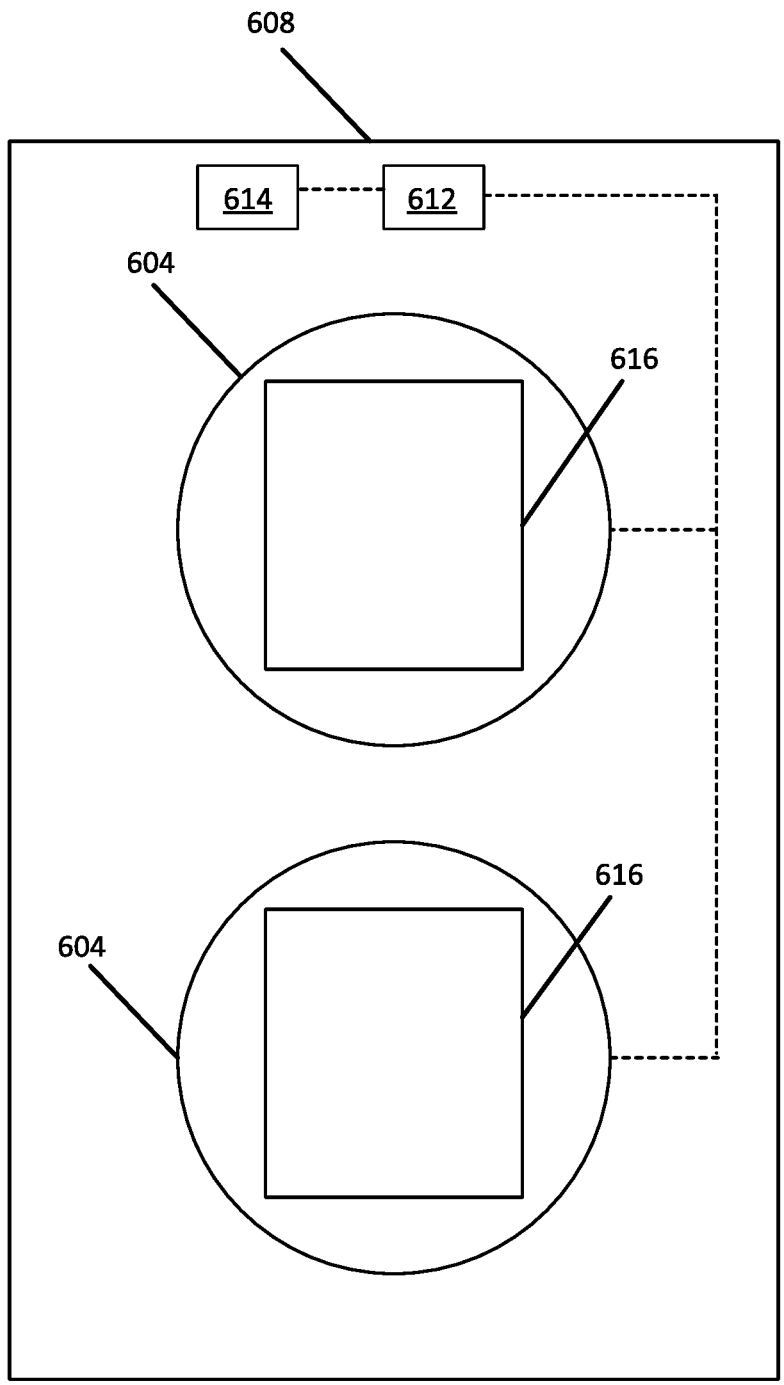
FIG. 6 is a rear view of a faceplate of the power outlet in the system of FIG. 4.

FIG. 6 is a rear view of the faceplate 608. As shown in FIG. 6, the faceplate 608 can include one or more openings 616 that surround the sockets 602 of the power outlet 600 when the faceplate 608 is mounted to the power outlet 600. The shape and configuration of the openings 616 in the faceplate 608 can be modified depending on the configuration of the sockets 602 in the power outlet 600. For example, faceplate 608 can have a single opening or multiple openings (e.g., two openings), and the openings of the faceplate 608 can be arranged in a vertical and/or horizontal configuration depending on the configuration of the sockets 602.

As shown in FIGS. 4 and 6, the faceplate 608 includes second antennas 604 embedded within a front surface of the faceplate 608. Each second antenna 604 has a shape that surrounds an opening 616 (and hence a socket 602 of the power outlet 600 when the faceplate 608 is mounted to the power outlet 600). In some examples, the shape of each second antenna 604 is an ellipse (e.g., circle, oval, coil etc.) that surrounds the one or more openings 616. In other examples, the shape of each second antenna 604 is a rectangle or square or other shape that can surround the one or more openings 616. In some examples, a single second antenna 604 can surround multiple openings 616. In some examples, it is contemplated that the second antenna 604 can be positioned in other areas of the faceplate 608.

In the example shown in FIGS. 2 and 6, the faceplate 608 includes two second antennas 604 (each second antenna 604 surrounding an opening 616). In other examples, the faceplate 608 can have a single second antenna 604, or can have more than two second antennas 604 as needed and/or desired for a particular application.

In some examples, the first antenna 508 is a passive near-field communication (NFC) antenna such that the first antenna 508 is a "target" antenna meaning that the first antenna 508 remains in a sleep state unless powered by a radio-frequency (RF) field actively generated by another antenna. In certain examples, the first antenna 508 can have a simple form factor such as an unpowered tag or sticker (e.g., having a coil shape that surrounds the one or more prongs 506 of the plug 504). The coil shape of the first antenna 508 can reduce and/or eliminate the electromagnetic interference from one or more conductors that run in the power cord 502.

In some examples, each second antenna 604 is an active NFC antenna that can power the first antenna 508. Each second antenna 604 can be part of a circuit that actively generates an RF field using power drawn from the power outlet 600. The RF field generated by each second antenna 604 can power the first antenna 508 when the first antenna 508 is spaced within a predetermined distance of a second antenna 604. In certain examples, the first antenna 508 is powered when spaced 4 cm or less from a second antenna 604. This can occur when the one or more prongs 506 of the plug 504 are received in a socket 602 of the power outlet 600 (and hence the first antenna 508 is proximate a second antenna 604). When the first antenna 508 is powered by a second antenna 604, the first antenna 508 transfers the device ID to the second antenna 604.

In alternative examples, the first antenna 508 is an active NFC antenna such that the first antenna 508 is part of a separate circuit 512 that actively generates an RF field using the first antenna 508 so that the first antenna 508 and a second antenna 604 of the power outlet 600 can wirelessly communicate with one another according to a peer-to-peer protocol. In such examples, the separate circuit 512 can be located in the device 500 (e.g., not in the plug 504), and the separate circuit 512 can be connected to the first antenna 508 via a wire that runs in the power cord 502. The separate circuit 512 of the first antenna 508 can be powered by the power outlet 600 via the wire in the power cord 102 when the one or more prongs 106 are inserted in a socket 602 of the power outlet 600.

As shown in FIGS. 4 and 6, the faceplate 608 includes a controller 612 connected to a communication module 614 and to each second antenna 604. In certain examples, the controller 612 is a microprocessor having an internal memory. In some examples, the internal memory of the controller 612 can store data such as a power outlet ID that can be used to identify the power outlet 600. In some examples, the internal memory of the controller 612 contains the data as read-only data. In some examples, the data stored on the internal memory of the controller 612 can be rewriteable. In some examples, the internal memory of the controller 612 can store other data in addition to the power outlet ID.

In some examples, the controller 612 can receive and store the device ID from a second antenna 604, and can use the communication module 614 to wirelessly transfer the device ID and the power outlet ID to the network 20 (see FIG. 1), In some alternative examples, the controller 612 can transfer the power outlet ID and the device ID to the network 20 via a wired connection.

As described above, the network 20 can transfer the device ID and the power outlet ID to the computer server 30. Thereafter, the computer server 30 can use the device ID and power outlet ID data to determine the location of the device 500 within a building, such as the healthcare facility 2 (see FIG. 1). For example, the computer server 30 can use a lookup table to determine the location of the device 500 using the device ID and the power outlet ID, and can also identify the location of a patient associated with the device 500 using the lookup table.

Figure 7:
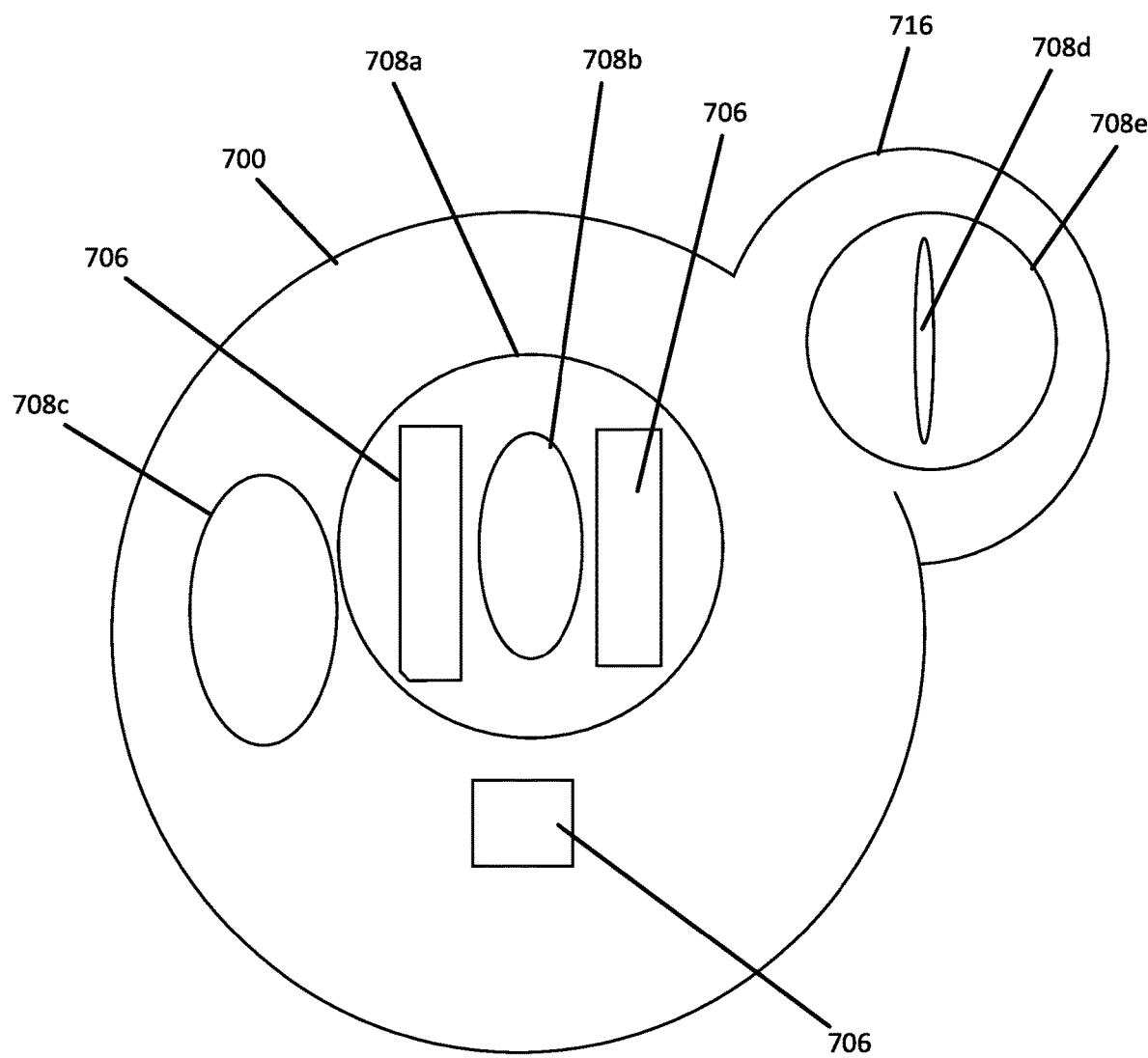
FIG. 7 is a front view of a plug showing alternative shapes and locations for an antenna carried by the plug.

FIG. 7 is a front view of a plug 700 for a medical device showing alternative shapes and locations for an antenna carried by the plug 700. These shapes and locations for the antenna can be implemented separately (i.e., a single antenna can be shaped and located in any of the positions shown) and/or multiple antenna can be provided on the plug 700.

As shown in FIG. 7, an antenna 708a has a coil shape and is located to surround one or more prongs 706 on the plug 700. The antenna 708a is similar to the first antenna 108 of the plug 104 described above, in that the antenna 708a is positioned to surround prongs 706 of the plug 700.

Another alternative antenna 708b has a coil shape and is located within a boundary at least partially defined by the prongs 706. In this example, the antenna 708b is completely bounded by the prongs 706 on at least two sides.

Another alternative antenna 708c has a coil shape and is located adjacent to the one or more prongs 706, but the antenna 708c does not surround the one or more prongs (unlike the antenna 708a), and the antenna 708c is not within a boundary defined by the one or more prongs 706 (unlike the antenna 708b).

In other examples, the antennas 708a, 708b, and 708c on the plug 700 can have shapes such as an ellipse, circle, oval, rectangle, square, and the like.

In view of the alternative shapes and locations of the antennas 708a, 708b, and 708c on the plug 700, a corresponding antenna (not shown) on a front surface of an adapter (such as the adapter 200 in FIGS. 2 and 3) or a faceplate of a power outlet (such as the power outlet 600 FIGS. 4 and 5) can have a shape and location that corresponds to the shape and location of an antenna 708a, 708b, and 708c so that when the plug 700 is inserted into the adapter or power outlet, the antenna 708a, 708b, and 708c on the plug 700 aligns with the corresponding antenna.

Alternatively, the plug 700 can have a form factor that includes a structure 716 that projects laterally from the long axis of the plug 700. As shown in FIG. 7, the structure 716 has an ear-like appearance. In this example, an antenna 708d having a linear shape that is parallel with the long axis of the plug 700 can be located in the structure 716. In yet another example, an antenna 708e having a coil shape can be located in the structure 716. In other examples, the antennas 708d and 708e can have shapes such as an ellipse, circle, oval, rectangle, square, and the like. Also, a front surface of an adapter (such as the adapter 200 in FIGS. 2 and 3) or a faceplate of a power outlet (such as the power outlet 600 FIGS. 4 and 5) can have a corresponding ear-like structure (not shown) that includes a corresponding antenna such that when the plug 700 is inserted into the adapter or power outlet, the antenna 708d and 708e in the structure 716 aligns with the corresponding antenna of the adapter or power outlet.

In the examples shown, the antenna is incorporated into the plug of the medical device. In alternative embodiments, the antenna can be incorporated as part of an adapter into which the plug of the medical device is inserted. This adapter can include the unique identifier for the medical device, as well as prongs to be connected to a power outlet and the antenna to communicate therewith as described herein. Other configurations are possible.

Although the configurations described herein include a passive antenna on the plug side and an active reader antenna on the outlet side, the sides could be switched. In this alternative, a passive sticker or faceplate including the antenna can be applied on the wall outlet side or a pass-through adapter that has memory and is passive. The plug for the medical device can include the reader, and the processor, and memory. The wireless radio can be provided on the bedside and is used to broadcast the identification information to an access point and/or a central server.

The various embodiments described above are provided by way of illustration only and should not be construed to limiting. Various modifications and changes that may be made to the embodiments described above without departing from the true spirit and scope of the disclosure.

What is claimed is:

1. A system for identifying a location of a device, the system comprising:
   a first antenna associated with a plug of the device, the first antenna mounted on the plug and having a coil shape that surrounds one or more prongs of the plug or is bounded by the one or more prongs on at least two sides, the one or more prongs extending out of the plug, and the plug having a memory that stores a device ID;
   a second antenna that receives the device ID from the first antenna when the plug is coupled to a power outlet; and
   a controller that receives the device ID from the second antenna, and that uses a communication module to wirelessly transfer the device ID and a power outlet ID identifying the power outlet to a computer server.

2. The system of claim 1, wherein the computer server includes a processor and memory, wherein the memory stores instructions that, when executed by the processor, cause the computer server to use the device ID and the power outlet ID to determine the location of the device within a building.

3. The system of claim 1, wherein the first antenna is a part of a circuit that is not wired to a power source, and the second antenna is part of a circuit that actively powers the first antenna to transfer the device ID to the second antenna.

4. The system of claim 1, wherein the first antenna and the second antenna are each connected to separate circuits that generate alternating radio frequency fields that allow the first antenna and the second antenna to wirelessly communicate with one another according to a peer-to-peer protocol.

5. The system of claim 1, wherein the second antenna is embedded in an adapter that connects to the power outlet, the adapter having at least one socket that receives the one or more prongs of the plug, and the second antenna having a coil shape that surrounds the at least one socket in the adapter.

6. The system of claim 5, wherein the adapter includes prongs that are insertable into at least one socket in the power outlet, and the adapter provides an electrical connection between the plug and the power outlet.

7. The system of claim 1, wherein the first antenna transfers the device ID to the second antenna when spaced by 4 cm or less from the second antenna.

8. The system of claim 5, wherein the controller and the communication module are embedded in a front surface of the adapter.

9. The system of claim 1, wherein the second antenna is embedded in a faceplate of the power outlet, the power outlet having at least one socket that receives the one or more prongs of the plug, and the faceplate having at least one opening that surrounds the at least one socket of the power outlet, wherein the second antenna has a coil shape that surrounds the at least one opening in the faceplate.

10. The system of claim 1, wherein the controller and the communication module are embedded in a faceplate of the power outlet.

11. The system of claim 1, wherein the device is a hospital bed.

12. A hospital bed comprising:
    a power cord having at one end a plug and one or more prongs extending from the plug that are configured to couple the plug to a power outlet, and
    a first antenna mounted on the plug where the one or more prongs extend from the plug, the first antenna having a coil shape that surrounds the one or more prongs of the plug or is bounded by the one or more prongs on at least two sides, and the first antenna is a near-field communication antenna having a memory that stores a device ID transferrable to a second antenna when the first antenna is proximate the second antenna, the device ID being usable by a computer server to determine the location of the hospital bed within a building.

13. The hospital bed of claim 12, wherein the first antenna is a passive near-field communication antenna that transfers the device ID to the second antenna when spaced by 4 cm or less from the second antenna.

14. The hospital bed of claim 12, wherein the first antenna is connected to a circuit that generates a radio frequency field that allows the first antenna to wirelessly communicate with the second antenna according to a peer-to-peer protocol.

* * * * *